(12) United States Patent
Van Davelaar

(10) Patent No.: US 6,200,113 B1
(45) Date of Patent: Mar. 13, 2001

(54) FLUID COUPLING ASSEMBLY AND METHOD

(75) Inventor: Peter C. Van Davelaar, Maidens, VA (US)

(73) Assignee: Dyax Corp., Cambridge, MA (US)

( * ) Notice: Subject to any disclaimer, the term of this patent is extended or adjusted under 35 U.S.C. 154(b) by 0 days.

(21) Appl. No.: 09/260,916

(22) Filed: Mar. 2, 1999

(51) Int. Cl.[7] .............. F04B 39/10; F16L 17/00; F16L 43/00
(52) U.S. Cl. ............ 417/571; 285/124.1; 285/343; 285/353
(58) Field of Search .................. 417/571, 572; 285/124.1, 124.3, 124.5, 339, 343, 353

(56) References Cited

U.S. PATENT DOCUMENTS

| | | | |
|---|---|---|---|
| 954,177 | * 4/1910 | Fleming | 285/353 |
| 1,638,114 | 8/1927 | Dunlap et al. | 417/571 |
| 2,195,547 | * 4/1940 | Vickers et al. | 285/124.1 |
| 2,510,125 | * 6/1950 | Meakin | 285/124.1 |
| 2,926,027 | * 2/1960 | Marquis, Jr. | 285/353 |
| 3,001,802 | * 9/1961 | Rebman et al. | 285/353 |
| 3,250,225 | 5/1966 | Taplin | 417/571 |
| 3,375,026 | * 3/1968 | Szohatzky | 285/343 |
| 3,476,412 | * 11/1969 | Demler, Sr. | 285/343 |
| 3,830,405 | * 8/1974 | Jaeger | 222/129.3 |
| 4,862,911 | 9/1989 | Tie | 137/454.4 |
| 5,011,382 | 4/1991 | Thompson | 417/571 |
| 5,350,200 | * 9/1994 | Peterson et al. | 285/353 |

* cited by examiner

Primary Examiner—Timothy S. Thorpe
Assistant Examiner—Michael K. Gray
(74) Attorney, Agent, or Firm—Fish & Richardson P.C.

(57) ABSTRACT

A fluid coupling assembly includes a first connection member, a second connection member, and a flow sealing member. The first connection member has an exterior surface, an interior surface and a threaded through hole from the exterior surface to the interior surface. The second connection member has a first sealing surface facing the interior surface of the first connection member, and a first flow passage. The first sealing surface is rigidly fixed with respect to the first connection member. The flow sealing member has external threads that mate with the threaded through hole, a second flow passage aligned with the first flow passage of the first member, and a second sealing surface that seals with the first sealing surface around the first and second flow passages upon application of sealing force via rotation of the external threads in the threaded hole.

30 Claims, 6 Drawing Sheets

A ↑
B ↓

FLUID COUPLING ASSEMBLY AND METHOD

BACKGROUND OF THE INVENTION

The invention relates to coupling of components in flow assemblies.

Tubing for delivering fluids must often be coupled with other components of a flow assembly, such as a valve. FIGS. 1A and 1B illustrate a prior art coupling device 10 for coupling tubing to a check valve. Device 10 defines two cylindrical bores 12a, 12b, has a check valve 14 between bores 12a, 12b, and defines two holes 16a, 16b connecting bores 12a, 12b to check valve 14. Two tubing apparatuses 18a, 18b have internal tubes 20a, 20b, internal conical surfaces 22a, 22b, external conical surfaces 24a, 24b, and external threads 26a, 26b for mating with internal threads 28a, 28b of bores 12a, 12b. Internal tubes 20a, 20b define two openings 30a, 30b and have two sealing faces 31a, 31b. In operation, apparatuses 18a, 18b are threadingly engaged with bores 12a, 12b. External conical surfaces 24a, 24b press against internal conical surfaces 22a, 22b, such that faces 31a, 31b seal around holes 16a, 16b. Since internal threads 28a, 28b are within cylindrical bores and extend to the flat bottoms of the bores ("blind holes"), they can be difficult to manufacture.

SUMMARY OF THE INVENTION

In general, in one aspect, the invention features a fluid coupling assembly including a first connection member, a second connection member, and a flow sealing member. The first connection member has an exterior surface, an interior surface and a threaded through hole from the exterior surface to the interior surface. The second connection member has a first sealing surface facing the interior surface of the first connection member, and a first flow passage. The first sealing surface is rigidly fixed with respect to the first connection member. The flow sealing member has external threads that mate with the threaded through hole, a second flow passage aligned with the first flow passage of the first member, and a second sealing surface that seals with the first sealing surface around the first and second flow passages upon application of sealing force via rotation of the external threads in the threaded hole.

Embodiments of this aspect of the invention may include one or more of the following features. The flow sealing member further includes an outer tightening member and an inner flow tube. The inner flow tube is disposed within an internal bore, and defines the second flow passage therethrough. Application of the sealing force causes sealing of the inner flow tube to the outer member. The outer tightening member has the external threads and has an inner conical surface around the internal bore.

The flow sealing member further includes a plastic deformable sealer which can be separable from the tightening member. The deformable sealer has an outer conical surface facing the inner conical surface and carrying the second sealing surface. The inner flow tube passes through the deformable sealer. Application of the sealing force via rotation of the external threads in the threaded hole causes sealing of the inner flow tube to the sealer and sealing of the sealer to the outer tightening member.

The second connection member includes a circular lip carrying the first sealing surface, and the first connection member has a circular opening for receiving the lip.

The second connection member includes a registration structure for aligning the first flow passage with the threaded through hole of the first connection member. The registration structure is a threaded bore communicating with the first sealing surface, and the first connection member has a clearance hole for aligning with the threaded bore.

The first and second connection members are made from a rigid material, such as metal, and the flow sealing member is made from a material less rigid than the first and second connection members, such as plastic.

The assembly has a plurality of flow sealing members, the first connection member has a plurality of threaded through holes for mating with the external threads of the flow sealing members, and the second connection member has a plurality of first flow passages for aligning with the second flow passages of the flow sealing members. For example, the assembly has two flow sealing members, two threaded through holes, and two first passages for aligning with the two second flow passages. For communicating with the two first flow passages, the sealing surface of the second connection member has an inlet and an outlet. The inlet and the outlet have different sizes, e.g., the inlet is larger than the outlet. A registration structure offset from the inlet and outlet aligns the two first flow passages with the two threaded through holes of the first connection member.

The second connection member further includes two check valves disposed in the two first flow passages. The first check valve prevents flow in a first direction, and the second check valve prevents flow in a second direction.

The two flow sealing members include a larger flow sealing member and a smaller flow sealing member. The two threaded through holes include a larger threaded through hole for mating with the larger flow sealing member, and a smaller threaded through hole for mating with the smaller flow sealing member.

The first and second sealing surfaces comprise a generally conical shape, and the second sealing surface is disposed on the outer tightening member.

In general, in another aspect, the invention features a flow assembly having a flow source, a flow destination, and a pump for delivering substance via a flow path from the source to the destination. In addition, the assembly has a fluid coupling assembly disposed within the flow path between the source and the destination. The coupling assembly includes a first connection member, a second connection member, and two flow sealing members. The connection member has an exterior surface, an interior surface and two threaded through holes from the exterior surface to the interior surface. The second connection member has a first sealing surface rigidly fixed with respect to the first member, facing the interior surface and two first flow passages. The two flow sealing members have external threads that mate with the two threaded through holes, two second flow passages aligned with the first flow passages of the first member, and two second sealing surfaces that seal with the first sealing surface around the first and second flow passages upon application of sealing force via rotation of the external threads in the threaded hole.

Embodiments of this aspect of the invention may include one or more of the following features. The flow sealing members have inner flow tubes. The inner flow tube of one of the sealing members connects to the flow source, and the inner flow tube of the other sealing member connects to the flow destination.

Embodiments of the invention may have one or more of the following advantages. The assembly avoids the necessity of including threading on the inside of a "blind hole" (threading extending to a flat bottom of a bore). The threaded through holes of the first connection member are easier to manufacture than a threaded blind hole.

The fluid coupling assembly is easily adaptable for coupling different types of components. For example, the coupling assembly can be used to couple tubing to receiving components other than check valves.

The components of the flow sealing member can be standard, commercially available products.

Other features and advantages of the invention will be apparent from the following description and from the claims.

DESCRIPTION OF THE PREFERRED EMBODIMENTS

Figure 1A:
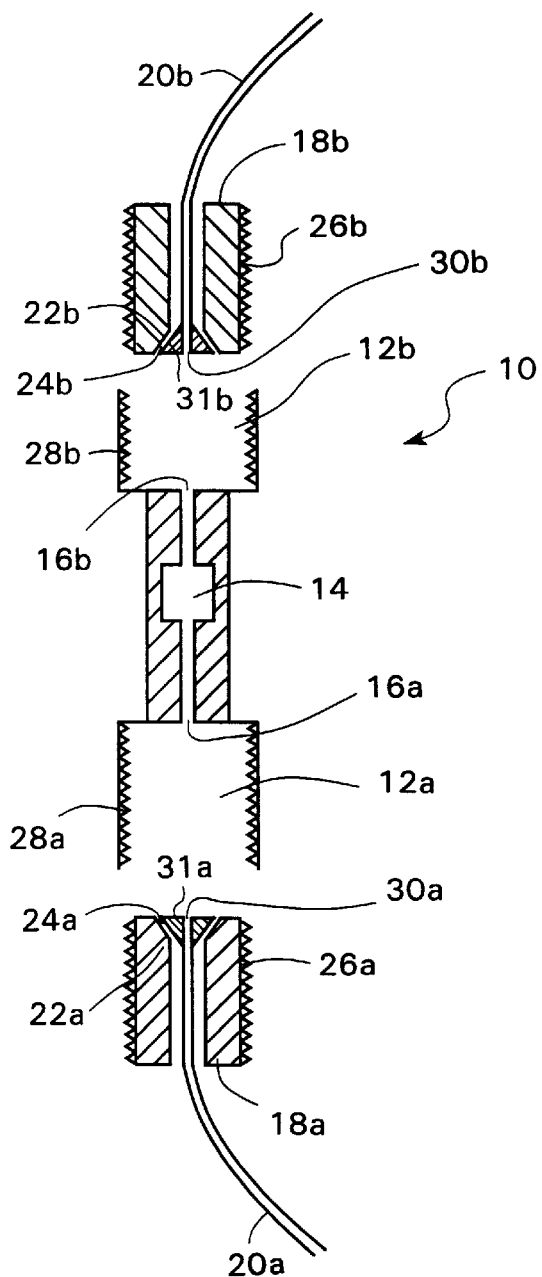
FIG. 1A is a sectional view of a prior art coupling assembly.
Figure 1B:
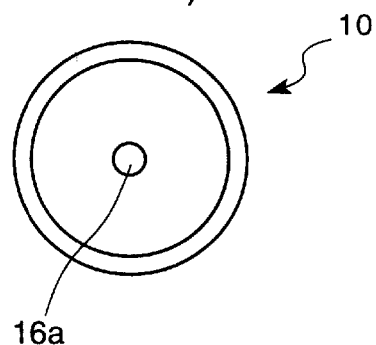
FIG. 1B is an end view of the prior art coupling assembly of FIG. 1A.
Figure 2:
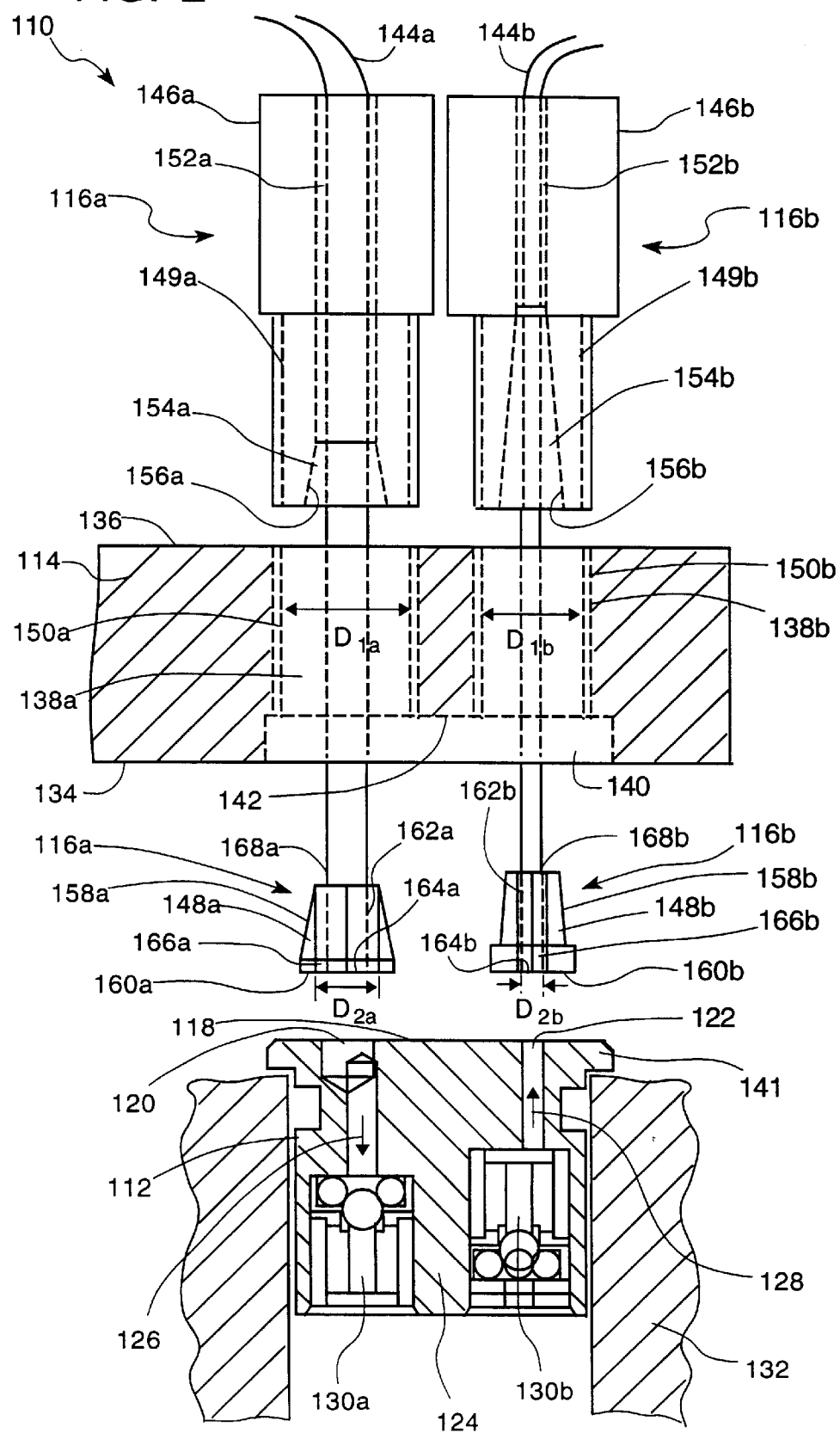
FIG. 2 is an exploded, sectional view of a fluid coupling assembly.

Referring to FIG. 2, fluid coupling assembly 110 includes a check valve module 112, a connecting plate 114, and two flow sealing assemblies 116a, 116b.

Check valve module 112 has a circular first sealing surface 118 defining an inlet 120 and an outlet 122. Inlet 120 is large enough to prevent, e.g., a drop in pressure experienced by fluid entering inlet 120 sufficient to cause degassing or cavitation. The interior 124 of module 112 defines an inflow path 126 in the direction of arrow B, and an outflow path 128 in the direction of arrow A. Interior 124 also includes two check valves 130a, 130b disposed within flow paths 126 and 128. Check valve 130a prevents flow in the direction of arrow A, and check valve 130b prevents flow in the direction of arrow B. Module 112 is disposed within a cylindrical conduit 132. The structure and operation of module 112 is described more fully in U.S. patent application Ser. No. 09/260,914, entitled "Check Valve Module," filed the same date as this application, and incorporated herein by reference in its entirety.

Figure 4:
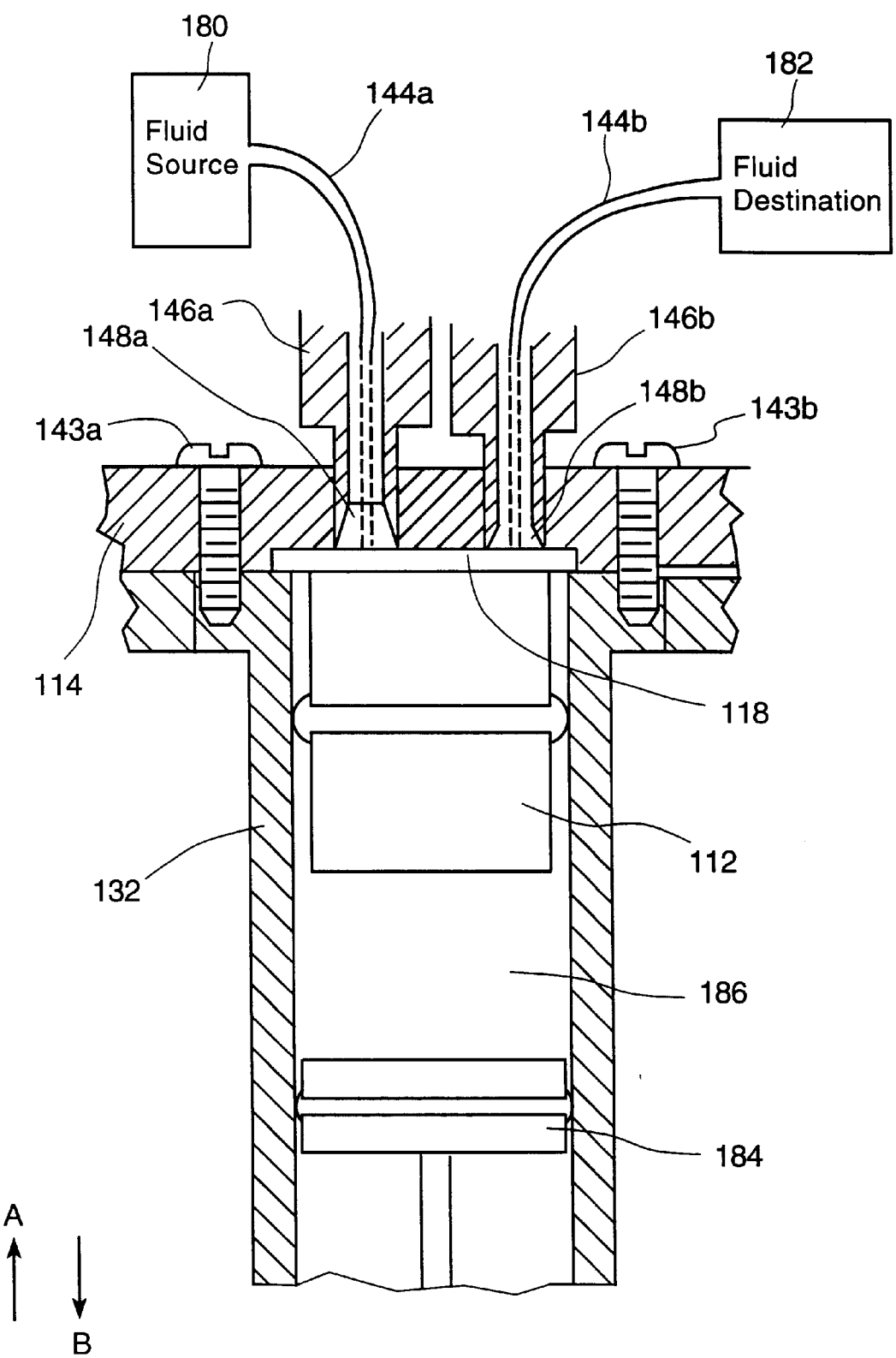
FIG. 4 is a sectional view of the assembly of FIG. 2 connected to a pump.

Connecting plate 114 includes a bottom surface 134, a top surface 136, and two threaded through holes 138a, 138b. Through hole 138a has a major diameter $D_1$ of, e.g., about 5/16 inches, and hole 138b has a major diameter $D_2$ smaller than diameter $D_1$, e.g., about 1/4 inch. Bottom surface 134 defines a generally circular opening 140 for receiving a lip portion 141 of module 112. Opening 140 includes an interior surface 142 for communicating with sealing surface 118 of module 112. Connecting plate 114 can be fastened to conduit 132 with two screws 143a, 143b (FIG. 4).

Figure 6:
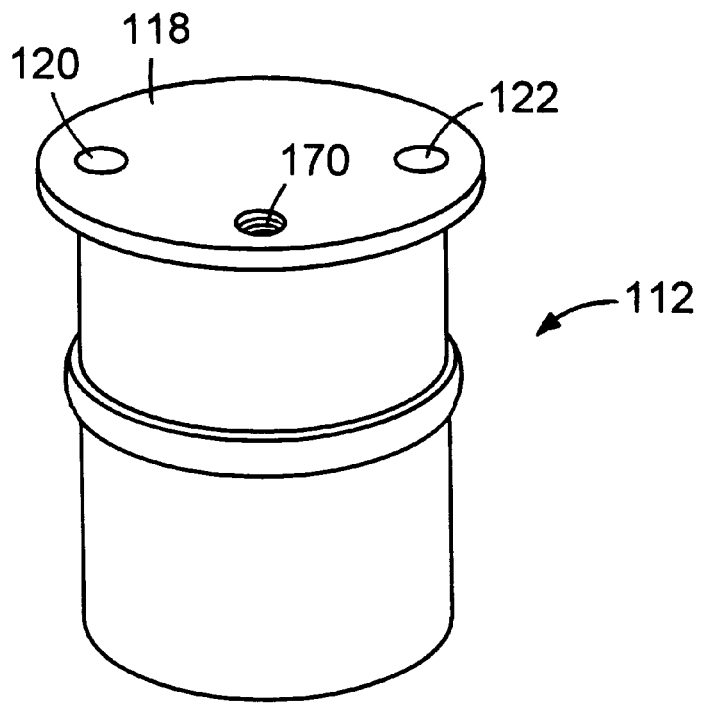
FIG. 6 is a perspective view of module 112 according to the invention.
Figure 7:
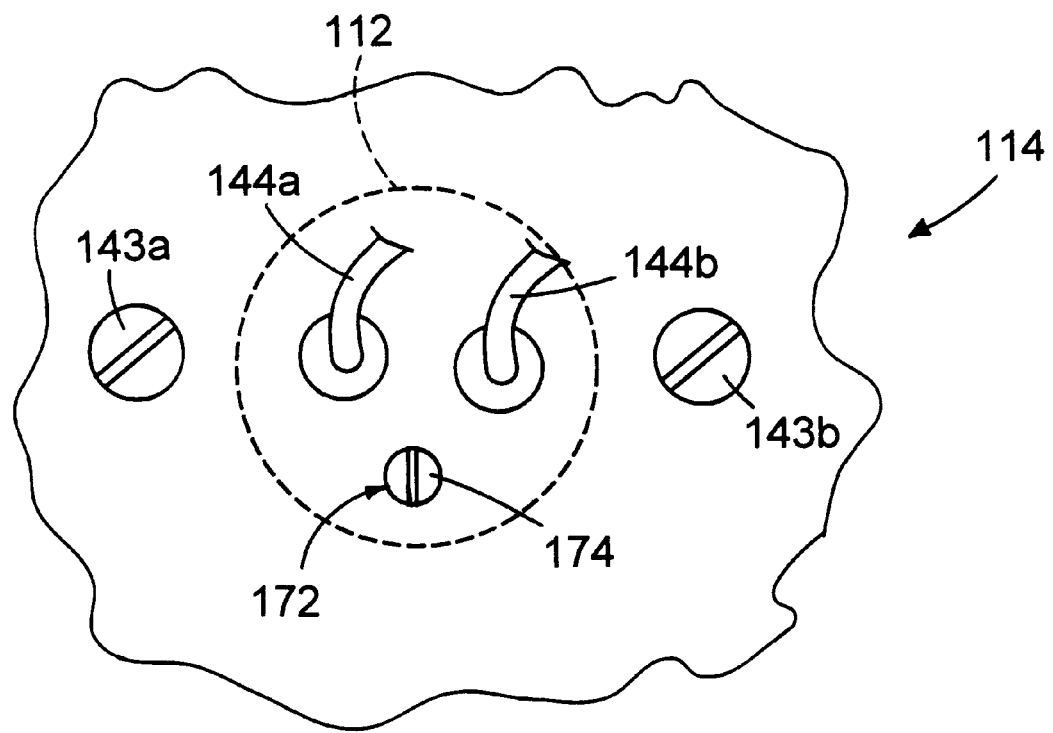
FIG. 7 is a top view of the connecting plate 114 according to the invention.

Referring to FIGS. 6 and 7, module 112 and connecting plate 114 also include registration structures for aligning through holes 138a, 138b with inlet 120 and outlet 122 respectively. Module 112 has a threaded alignment bore 170 which communicates with surface 118, and connecting plate 114 has an aligning clearance hole 172 for aligning with the threaded bore. A screw 174 passes through clearance hole 172 and threads into bore 170 to align holes 138a and 138b with inlet 120 and outlet 122 respectively. The registration structures are described in the U.S. patent application entitled "Check Valve Module."

Flow sealing assemblies 116a, 116b each include three separate pieces: an interior tube 144a, 144b, a tightening member 146a, 146b, and a deformable sealer 148a, 148b. Tightening members 146a, 146b have external threads 149a, 149b for mating with internal threads 150a, 150b of through holes 138a, 138b respectively. Tightening members 146a, 146b also define bores 152a, 152b. Each bore 152a, 152b defines an interior conical section 154a, 154b having an interior conical sealing surface 156a, 156b.

Deformable sealers 148a, 148b have exterior conical surfaces 158a, 158b sized and shaped to mate with interior conical sealing surfaces 156a, 156b respectively, and second sealing surfaces 160a, 160b for sealingly engaging first sealing surface 118 of module 112. Each sealer 148a, 148b defines an internal cylindrical bore 162a, 162b for receiving tubes 144a, 144b respectively. Bore 162a has a circular opening 164a which is similar in size to inlet 120 of module 112, and bore 162b has a circular opening 164b which is similar in size to outlet 122 of module 112. Thus, when second sealing surfaces 160a, 160b are pressed against first sealing surface 118 of module 112, surfaces 160a, 160b seal around inlet 20 and outlet 22 respectively. Opening 164a has a diameter $D_{2a}$ of, e.g., about 1/8 inch, and opening 164b has a diameter $D_{2b}$ of, e.g., about 1/16 inch.

Tubes 144a, 144b pass through bores 152a, 152b respectively, through opening 140 of plate 114, and through bores 162a, 162b respectively of deformable sealers 148a, 148b. Tube 144a is wider than tube 144b.

In operation, tubes 144a, 144b are passed through bores 152a, 152b of tightening members 146a, 146b respectively, and then passed through bores 162a, 162b of sealers 148a, 148b respectively. Tubes 144a, 144b fit snugly within bores 162a, 162b. Sealers 148a, 148b are then inserted into conical sections 154a, 154b of bores 152a, 152b respectively, such that exterior conical surfaces 158a, 158b engage interior conical surfaces 156a, 156b respectively.

Next, connecting plate 114 is affixed to conduit 132 using screws 143a, 143b (FIG. 4), such that sealing surface 118 of module 112 firmly engages interior surface 142 of plate 114. A threaded screw (not shown) is passed through the aligning clearance hole in the connecting plate and into the threaded alignment bore of module 112, aligning through holes 138a, 138b with inlet 120 and outlet 122, respectively. Tightening members 146a, 146b are then affixed within through holes 138a, 138b respectively of plate 114 by engaging external threads 149a, 149b with internal threads 150a, 150b.

Figure 3:
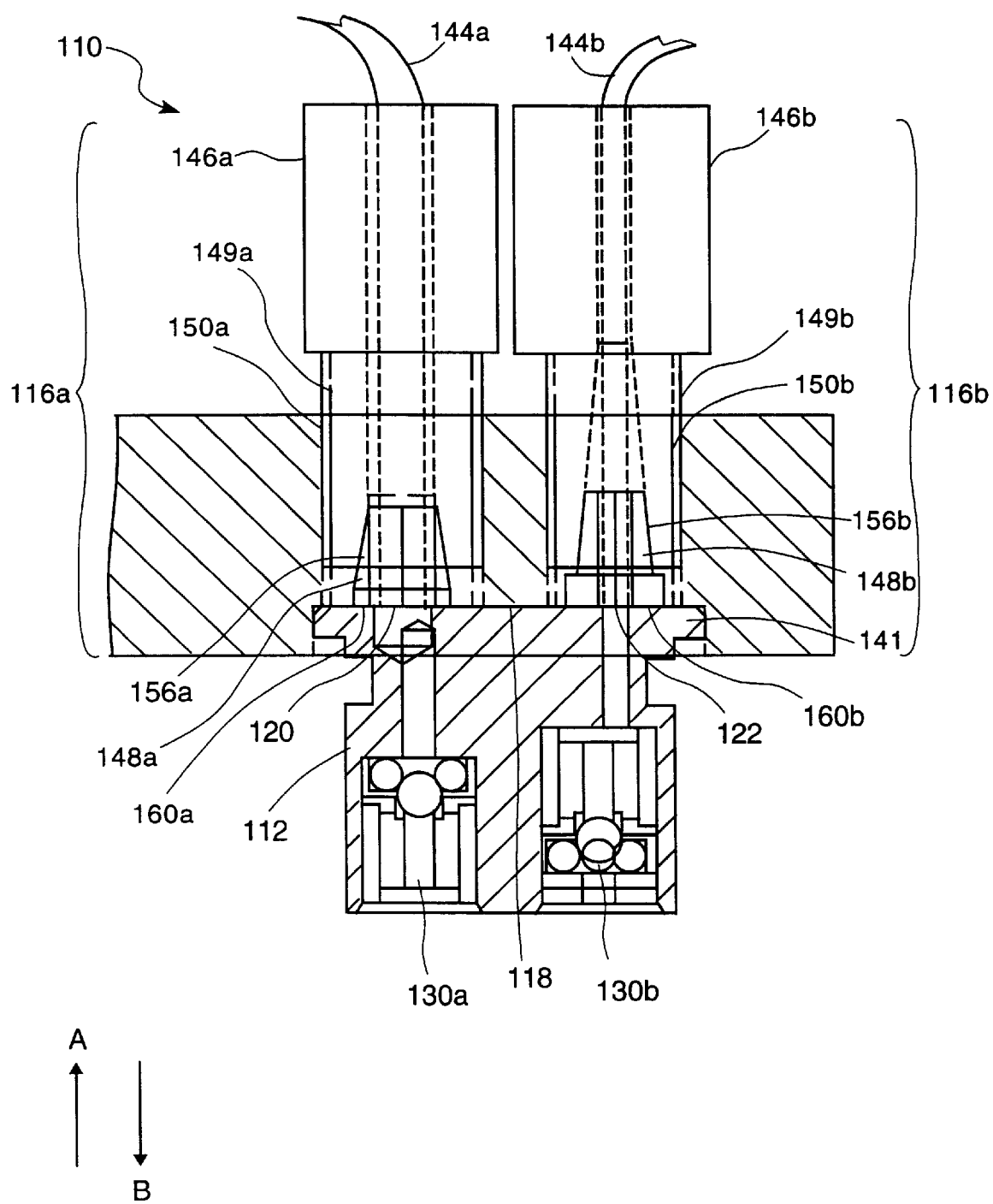
FIG. 3 is a sectional view of the assembly of FIG. 2, shown assembled.

Engaging threads 149a, 149b with threads 150a, 150b, aligns openings 164a, 164b of sealers 148a, 148b with inlet 20 and outlet 22 of module 112. Further tightening of the threads pushes interior conical surfaces 156a, 156b against exterior conical surfaces 158a, 158b of sealers 148a, 148b, which pushes second sealing surfaces 160a, 160b firmly against first sealing surface 118. This tightening action slightly deforms deformable sealers 148a, 148b, thereby firmly sealing surfaces 160a, 160b to surface 118. The tightening action also seals interior surfaces 166a, 166b of bores 162a, 162b in sealers 148a, 148b to an outer surface 168a, 168b of tubes 144a, 144b. FIG. 3 shows fluid coupling assembly 110 assembled.

FIG. 4 illustrates a use for coupling assembly 110. Referring to FIG. 4, tube 144a is connected to a fluid source 180, and tube 144b is connected to a fluid destination 182. A piston 184 is disposed within conduit 132. Fluid source 180 can be, e.g., a mobile phase for column chromatography, and fluid destination 182 can be, e.g., a column chromatography cartridge, as described in U.S. patent application Ser. No. 09/260,915, entitled "Pump Drive Decoupler," and U.S. patent application Ser. No. 09/264,846, entitled "Cartridge Sealing Apparatus and Method." Both the above applications were filed the same date as this application, and are incorporated herein by reference in their entirety.

In operation, movement of piston 184 in the direction of arrow B draws fluid from fluid source 144a, through coupling assembly 110, and into a chamber 186 within conduit 132. Movement of piston 184 in the direction of arrow A pushes fluid from chamber 186, through coupling assembly 110, and to fluid destination 182. The operation of piston 184 and the movement of fluid, e.g., through module 112, is described further in the U.S. patent applications entitled "Pump Drive Decoupler" and "Check Valve Module."

The components of assembly 110 can be manufactured from various materials. Module 112, plate 114, and vessel 132 are preferably metal, and the components of flow assemblies 116a, 116b are preferably plastic.

The tightening members and deformable sealers can be ordered commercially from, e.g., UPCHURCH SCIENTIFIC in Oak Harbor, Wash. Tightening member 146a can be, e.g., part P-130, a 5/16-24 flat bottom male nut. Tightening member 146b can be, e.g., part P-230, a 1/4-28 flat bottom male nut. Deformable sealers 148a, 148b can be, e.g., ferrules P-200 and P-300, respectively.

Figure 5:
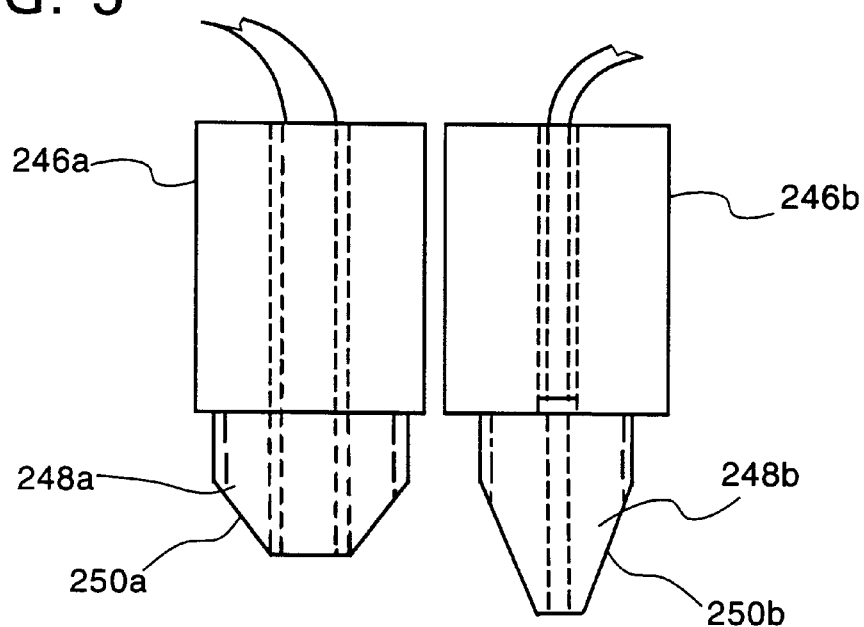
FIG. 5 is an exploded, sectional view of an alternate embodiment of the assembly of FIG. 2.
Figure 5:
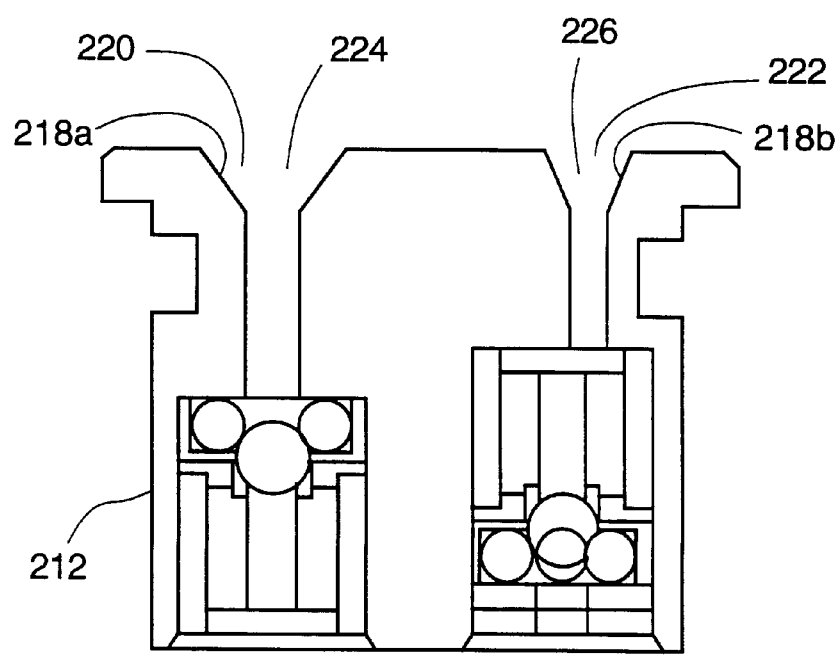

Other embodiments are within the scope of the claims. For example, referring to FIG. 5, an inlet 220 and an outlet 222 of a check valve module 212 might have conical indentations 224, 226 rather than a flat, circular opening. In this embodiment, two tightening members 246a, 246b (not to scale) have conical shaped tips 248a, 248b, and the deformable sealers are eliminated. Tips 248a, 248b have exterior conical sealing surfaces 250a, 250b which seal with internal conical sealing surfaces 218a, 218b of indentations 224, 226 when pushed into place by a connecting plate (not shown), as described above. Alternatively, instead of tips 248a, 248b, conical deformable sealers oriented in the same direction as tips 248a, 248b can be used.

The deformable sealers and sections 154a, 154b of bores 152a, 152b can have a shape other than conical.

The size of tubes 144a, 144b and the bores through which tubes 144a, 144b are inserted can be varied. Tightening members 146a, 146b can be affixed to plate 114 using a mechanism other than threads. The shapes of opening 140 and lip 141 can be different, e.g. square. In addition, module 112 need not include a lip 141, and plate 114 need not include an opening 140.

Instead of module 112, assembly 110 can include another type of valve, or a non-valve connection member. If a connection member having an inlet but no outlet is used, then coupling assembly 110 can have only one tightening member, one bore in plate, and one deformable sealer. Alternatively, if the connection member used in place of module 112 has more than two receiving openings, then assembly 110 can have more than two tightening members, deformable sealers, and bores.

What is claimed is:

1. A fluid coupling assembly comprising:
   a first connection member having an exterior surface, an interior surface and a threaded through hole from said exterior surface to said interior surface;
   a second connection member having a first sealing surface facing said interior surface and a first flow passage, said first sealing surface being rigidly fixed with respect to said first member; and
   a flow sealing member having external threads that mate with said threaded through hole, a second flow passage aligned with said first flow passage of said second member, and a second sealing surface that seals against said first sealing surface around said first and second flow passages upon application of sealing force via rotation of said external threads in said threaded hole.

2. The assembly of claim 1, wherein said flow sealing member comprises:
   an outer tightening member having said external threads and defining an internal bore; and
   an inner flow tube disposed within said internal bore, said flow tube defining said second flow passage therethrough,
   wherein said application of said sealing force causes sealing of said inner flow tube to said outer member.

3. The assembly of claim 2, wherein said outer tightening member has an inner conical surface around said internal bore, and wherein said flow sealing member further comprises a deformable sealer having an outer conical surface facing said inner conical surface and carrying said second sealing surface, said inner flow tube passing through said deformable sealer, wherein said application of said sealing force via rotation of said external threads in said threaded hole causes sealing of said inner flow tube to said sealer and sealing of said sealer to said outer tightening member.

4. The assembly of claim 3, wherein said outer tightening member and said deformable sealer comprise two separable pieces.

5. The assembly of claim 3, wherein said deformable sealer comprises a plastic.

6. The assembly of claim 1, wherein said second connection member comprises a lip carrying said first sealing surface.

7. The assembly of claim 6, wherein said first connection member defines an opening for receiving said lip.

8. The assembly of claim 7, wherein said lip and said opening for receiving said lip comprise a generally circular shape.

9. The assembly of claim 1, wherein said second connection member includes a registration structure for aligning said first flow passage with said threaded through hole of said first connection member.

10. The assembly of claim 9, wherein said registration structure comprises a threaded bore communicating with said first sealing surface, and said first connection member comprises a passage for aligning with said threaded bore of said registration structure.

11. The assembly of claim 1, wherein said first and second connection members comprise a rigid material, and said flow sealing member comprises a material less rigid than said first and second connection members.

12. The assembly of claim 11, wherein said first and second connection members comprise a metal, and said flow sealing assembly comprises a plastic.

13. The assembly of claim 1, wherein said first connection member has a second threaded through hole from said exterior surface to said interior surface, said second connection member has a second first flow passage, and said assembly further comprises a second flow sealing member having external threads that mate with said second threaded through hole, said second flow sealing member having a flow passage aligned with said second first flow passage of said second member.

14. The assembly of claim 13, wherein said sealing surface of said second connection member comprises an inlet and an outlet, said inlet and outlet communicating with said two first flow passages.

15. The assembly of claim 14, wherein said inlet and said outlet have different sizes.

16. The assembly of claim 15, wherein said inlet is larger than said outlet.

17. The assembly of claim 14, wherein said second connection member includes a registration structure for aligning said two first flow passages with said two threaded through holes of said first connection member.

18. The assembly of claim 17, wherein said registration structure comprises a threaded bore communicating with said first sealing surface, and said first connection member comprises a passage for aligning with said threaded bore of said registration structure.

19. The assembly of claim 18, wherein said threaded bore is offset from said inlet and said outlet.

20. The assembly of claim 14, wherein said second connection member further comprises two check valves disposed in said two first flow passages, a first said check valve preventing flow in a first direction, and the second said check valve preventing flow in a second direction.

21. The assembly of claim 13, wherein said two flow sealing members include a larger flow sealing member and a smaller flow sealing member, and said two threaded through holes include a larger threaded through hole for mating with said larger flow sealing member, and a smaller threaded through hole for mating with said smaller flow sealing member.

22. The assembly of claim 2, wherein said first and second sealing surfaces comprise a generally conical shape, and said second sealing surface is disposed on said outer tightening member.

23. A flow assembly comprising:

a flow source;

a flow destination;

a pump for delivering substance via a flow path from said source to said destination; and a fluid coupling assembly disposed within said flow path between said source and said destination, said coupling assembly comprising:

a first connection member having an exterior surface, an interior surface and two threaded through holes from said exterior surface to said interior surface;

a second connection member having a first sealing surface facing said interior surface and two first flow passages, said first sealing surface being rigidly fixed with respect to said first member; and two flow sealing members having external threads that mate with said two threaded through holes, two second flow passages aligned with said first flow passages of said second member, and two second sealing surfaces that seal with said first sealing surface around said first and second flow passages upon application of sealing force via rotation of said external threads in said threaded hole.

24. The flow assembly of claim 23, wherein said second connection member comprises two check valves, a first said check valve preventing flow in a first direction, and a second check valve preventing flow in a second direction.

25. The flow assembly of claim 23, wherein said first sealing surface comprises an inlet and an outlet, and said two second sealing surfaces seal around said inlet and said outlet.

26. The flow assembly of claim 23, wherein each said flow sealing member comprises:

an outer tightening member having said external threads and defining an internal bore; and an inner flow tube disposed within said internal bore, said flow tube defining said second flow passage therethrough, wherein said application of said sealing surface causes sealing of said inner flow tube to said outer member.

27. The flow assembly of claim 26, wherein a first said inner flow tube connects to said flow source, and a second said inner flow tube connects to said flow destination.

28. A method of coupling components in a flow assembly, the method comprising:

providing a first connection member having a through hole, a second connection member having a first sealing surface and a first flow passage, and a flow sealing member having a second sealing surface and a second flow passage;

passing said flow sealing member through said through hole, such that said first flow passage aligns with said second flow passage;

applying sealing force, such that said first sealing surface seals against said second sealing surface.

29. The method of claim 28, wherein said providing step includes providing internal threads within said through hole and external threads upon said flow sealing member, and wherein said passing step includes engaging said internal threads with said external threads.

30. The method of claim 29, wherein said applying sealing force includes rotating said sealing member with respect to said through hole, pressing said second sealing surface against said first sealing surface.

* * * * *